Patented June 22, 1926.

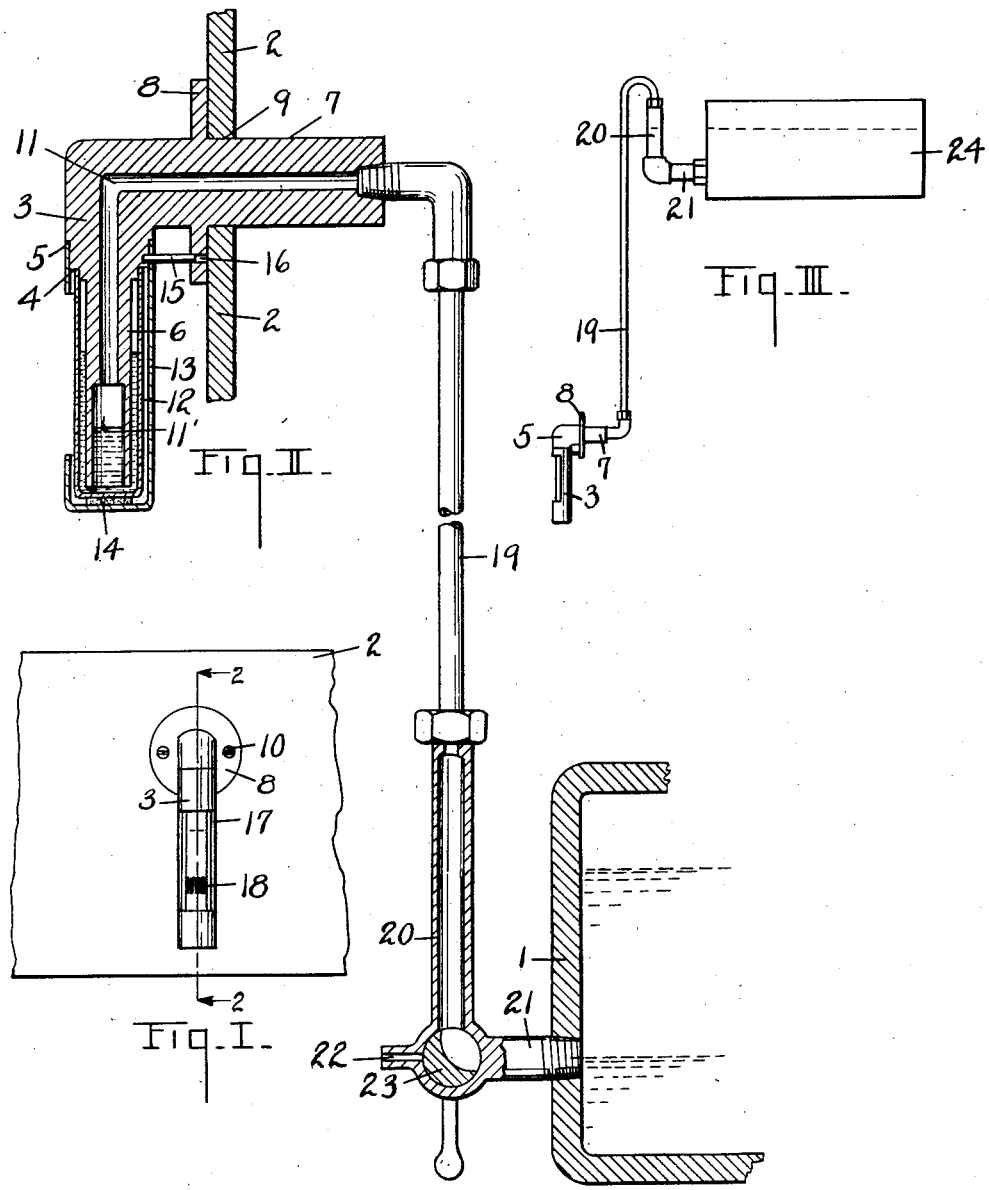

1,589,509

UNITED STATES PATENT OFFICE.

ALICK L. CARTER, OF KENMORE, NEW YORK, ASSIGNOR, BY MESNE ASSIGNMENTS, TO THE GROLAN MANUFACTURING COMPANY, OF DAYTON, OHIO, A CORPORATION OF DELAWARE.

LIQUID-LEVEL GAUGE.

Application filed November 21, 1921. Serial No. 516,762.

This invention relates to improvements in liquid level gauges.

The main objects of this invention are,

First, to provide an improved liquid gauge which is well adapted as a gauge for the crank case of automobile engines for indicating the level of the oil therein.

Second, to provide an improved liquid gauge adapted for this purpose which is quickly and easily installed.

Third, to provide an improved liquid gauge of this character which is not materially affected by changes in temperature.

Further objects, and objects pertaining to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Fig. I is a front view of the gauge as it is mounted upon the instrument board of a motor vehicle, the instrument board being partially broken away.

Fig. II is a detail view, partially in vertical section, on a line corresponding to line 2—2 of Fig. I showing the relation of parts when installed on an engine.

Fig. III is a side elevation of my improved gauge applied to a liquid receptacle in which the receptacle is above the gauge.

In the drawing the sectional views are taken looking in the direction of the little arrows at the ends of the section lines and similar numerals of reference refer to similar parts throughout the several views.

Referring to the drawing, 1 represents the receptacle containing the liquid to be gauged, such as the crank case of an automobile, and 2 the instrument board of an automobile. My improved gauge in the embodiment as illustrated comprises a tubular gauge member or body 3 having stepped shoulders 4 and 5 and a reduced lower end 6. At its upper end the gauge member is provided with a horizontally disposed arm 7 having an attaching flange 8 so that the arm may be arranged through a hole 9 in the instrument board and secured therethrough by the screws 10 in the flange 8. The gauge member has a bore 11 therethrough terminating in an enlargement 11' at the lower end of the gauge member, said bore forming ports in horizontal and upright parts of the gauge member.

A tubular receptacle 12 for the gauging liquid, the receptacle being preferably of glass, is arranged to embrace the lower end of the gauge member with its upper end fitting the shoulder 4 sufficiently loose to maintain communication between the upper end of the tubular receptacle 12 and the outer atmosphere. This gauge member is supported by the casing 13 which engages the shoulder 5, there being a block or cushion of resilient material 14 in the bottom of the casing engaging the receptacle 12 and clamping it against the shoulder. The casing is supported by the pin 15, the outer end of this pin extending through the hole 16 in the flange which supports the end of the pin and at the same time allows it to be retracted to release the casing. The casing has an opening 17 therein exposing the liquid within the receptacle 12. The liquid receptacle is provided with a mark 18 to indicate the low level point. The arm 7 is connected to the receptacle to be gauged by the conduit 19 and the expansion tube 20. The diameter of the bore of the expansion tube is substantially greater than that of the conduit.

I have not in the accompanying drawing attempted to maintain the exact relative proportion. The expansion tube is provided with an arm 21 threaded into the receptacle 1 and with a drain 22. This expansion tube is controlled by the three-way valve 23 which may be turned to admit liquid to the expansion tube or to cut off the expansion tube from the receptacle 1 and drain the liquid from the expansion tube and to admit air thereto and to the conduit and the gauge above the gauging liquid therein.

By the employment of the expansion tube, I find that my improved gauge is not materially effected by changes in temperature. In the modification shown in Fig. III, the tank 24 is disposed above the gauge but the operation is the same. The valve 23 is omitted from this modification.

I have not attempted to illustrate or describe all the modifications or adaptations which I contemplate as I believe the disclosure made will enable those skilled in the art to which my invention relates to embody or adapt the same as may be desired.

Having thus described my invention, what I claim as new and desire to secure by Letters Patent, is:—

1. A pressure gauge, comprising an upright body having an upper enlarged end, a lower reduced end and downwardly facing upper and lower external shoulders between said upper enlarged and lower reduced parts, and an arm projecting laterally from the upper end of said body and provided with an attaching flange, said body and arm having a passage therethrough and comprising a longitudinal upper port arranged in said arm and a vertical lower port arranged in said body and terminating at its lower end in an enlargement, a transparent tube surrounding said body and separated therefrom by an intervening annular liquid space and having an open upper end which communicates with the atmosphere and engages said lower shoulder and has a closed lower end which is spaced from the lower end of said body, the space between said body and transparent tube and the lower part of the passage in the body being adapted to receive a gauge liquid, and a tubular guard casing surrounding said transparent tube and having a sight opening and engaging its upper end with said upper shoulder and having a bottom arranged below the closed lower end of said transparent tube.

2. A pressure gauge comprising an upright body having an upper enlarged end, a lower reduced end and downwardly facing upper and lower external shoulders between said upper enlarged and lower reduced ends, and an arm projecting laterally from the upper end of said body and provided with an attaching flange, said body and arm having a passage therethrough and comprising a horizontal upper port arranged in said arm and a vertical lower port arranged in said body and terminating at its lower end in an enlargement, a transparent tube surrounding said body and separated therefrom by an intervening annular liquid space and having an open upper end which communicates with the atmosphere and engages said lower shoulder and has a closed lower end which is spaced from the lower end of said body, the space between said body and transparent tube and the lower part of the passage in the body being adapted to receive a gauge liquid, a tubular guard casing surrounding said transparent tube and having a sight opening and engaging its upper end with said upper shoulder and having a bottom arranged below the closed lower end of said transparent tube, and a locking pin engaging with said body, casing and flange.

3. In a pressure gauge, the combination with a body consisting of an upright portion and a horizontal portion provided with an open-ended passage extending through both portions, said upright portion having a reduced lower part and provided with stepped shoulders at its upper part, of an attaching flange carried by the horizontal portion, a transparent tube telescopically engaging over a lower shoulder of the upright portion and separated therefrom by an intervening annular liquid space communicating at its lower end with the passage, and a guard casing surroundingly spaced from the transparent tube and having a side opening, the upper end of the guard casing telescopically fitting an upper shoulder of the upright portion, and means removably engaging through the flange and through the guard casing and into the upright portion to retain the guard casing removably in position.

In witness whereof, I have hereunto set my hand and seal.

ALICK L. CARTER. [L. S.]